United States Patent [19]

Noda

[11] Patent Number: 5,719,638
[45] Date of Patent: Feb. 17, 1998

[54] HIGH SPEED IMAGE DENSITY CONVERTING APPARATUS

[75] Inventor: Yukihiro Noda, Chikugo, Japan

[73] Assignee: Rohm Co. Ltd., Kyoto, Japan

[21] Appl. No.: 499,505

[22] Filed: Jul. 7, 1995

[30] Foreign Application Priority Data

Jul. 11, 1994 [JP] Japan .................... 6-158745

[51] Int. Cl.⁶ .................. H04N 5/14; H03M 1/12
[52] U.S. Cl. ...................... 348/572; 348/678
[58] Field of Search ................... 348/572, 573, 348/678, 690, 641, 707; 341/155, 158, 165

[56] References Cited

U.S. PATENT DOCUMENTS

| | | | |
|---|---|---|---|
| 4,768,015 | 8/1988 | Amano | 348/572 |
| 5,087,973 | 2/1992 | Kawahara | 348/572 |
| 5,121,117 | 6/1992 | Rabii | 348/572 |
| 5,532,758 | 7/1996 | Honma | 348/572 |

FOREIGN PATENT DOCUMENTS 402288482   11/1990   Japan .................... 348/572

*Primary Examiner*—Victor R. Kostak
*Attorney, Agent, or Firm*—Nikaido Marmelstein Murray & Oram LLP

[57] ABSTRACT

A high speed image density converting apparatus includes an amplifier for amplifying an analog video signal, an A/D converter for converting an output of the amplifier into a digital video signal, and capable of setting a reference voltage, a memory for storing an output image of the A/D converter, an arithmetic device for calculating a reference signal value on the basis of the data stored in the memory, and a D/A converter for converting the reference signal issued from the arithmetic device into an analog signal to be supplied as reference voltage to the A/D converter.

2 Claims, 6 Drawing Sheets

HIGH SPEED IMAGE DENSITY CONVERTING APPARATUS

BACKGROUND OF THE INVENTION

The present invention relates to a high speed image density converting apparatus. More particularly, it relates to a high speed image density converting apparatus by improving the contrast of an observed image so as to be easier to see by man.

When an image is entered by a drum scanner, vidicon camera, or the like the image density may be distributed only in part [a,b] of the entire permissible density range $[z_1, z_k]$, as shown in FIG. 5(a), due to shortage of exposure or improper setting of density range when digitizing. In such image distributed only in part [a,b], for the human eye, the contrast is low, and it is hard to recognize the detail. A simplest method of improving the image contrast so as to be easy to see is presented, for example, by Hideyuki Tanaka in "Introduction to Computer Image Processing" (SOKEN SHUPPAN, 1985, p. 96), that is, as graphically shown in FIG. 5(b), the density value x of each pixel (a≦x≦b) is converted according to formula (1), which is known as density gradation converting method.

$$z = \frac{z_k - z_1}{b - a}(x - a) + z_1 \quad (1)$$

That is, according to formula (1), the density range [a, b] is enlarged and moved parallel so that the density distribute in the entire density range of $[z_1, z_k]$, so that the contrast is enhanced. As this enlarging method, the method of density graduation conversion by the conventional software, and the contrast converting method by the amplification effect of operational amplifier or the like are known.

FIG. 6 is a block diagram for converting the density by software. First, the analog video signal, taken by a vidicon camera or the like, is converted into a digital video signal in an A/D converter 21, and is stored in a memory 22. The stored digital video signal is converted in the density gradation by the software according to formula (1). It is then presented to an image recognition processor 23 for position analysis, defective sorting or the like, and is converted into an analog signal in a D/A converter 24, and then presented to an analog signal processor 25 or monitor television or the like.

FIG. 7 is a block diagram for contrast conversion by amplification effect by an operational amplifier or the like, in which the analog video signal, taken by the vidicon camera or the like, is first put into an amplifier 26, and converted in contrast by a variable resistor. In the case of display in monitor TV or the like, it is directly sent into the analog signal processor 25, or if applied to the recognition processor 23 for position analysis, defective sorting or the like, the output of the amplifier 26 is put into an A/D converter 21, and is stored in a memory 22 as digital video signal, and is presented to the recognition processor 23 as required.

In the case of density gradation converting processing by software, the signal digitized after A/D conversion must be taken into the memory, and it takes thirty-three milliseconds (ms) to convert the whole scanning line data by interlacing, for example, in the NTSC standard (a standard of video signal transmission). By further checking the entire image data, the maximum luminance and minimum luminance are obtained, and the whole image data must be converted by conforming to formula (1), and in the case of pixel precision of 512×480, checking and conversion calculation must be done 245760 times each (which takes about tens of milliseconds to several seconds, depending on the memory, CPU, and software quality). It hence takes a very long time in conversion processing, and it is not suited to image processing of moving pictures or where speed is required.

Furthermore, in the case of contrast conversion by amplification effect of operational amplifier or the like, conversion is effected in batch by the amplifier, and the image information can be obtained in real time from the viewpoint of speed, but it is necessary to adjust on every occasion of fluctuations of the optical system, such as environmental changes of light source and natural light, material of object, position, reflectivity, and other subject fluctuations (generally the subject luminance is expressed as luminance= illumination intensity×cosθ×reflectivity, where θ is the angle to the light source) and it is impossible to follow up in the rapidly changing environments of optical system or unmanned line, and it is not practicable.

SUMMARY OF THE INVENTION

Solving such problems, it is hence an object of the invention to present a high speed density converting apparatus capable of converting the density gradation in real time and following up if the optical system fluctuates.

To achieve the object, the invention provides a high speed image density converting apparatus comprising an amplifier for amplifying an analog video signal, an A/D converter for converting an output of the amplifier into a digital video signal, and capable of setting a reference voltage, a memory for storing an output image of the A/D converter, arithmetic means for calculating a reference signal value on the basis of the data stored in the memory, and a D/A converter for converting the reference signal issued from the arithmetic means into an analog signal to be supplied as reference voltage to the A/D converter.

Herein, the A/D converter capable of setting the reference voltage is an A/D converter of which range specified by the reference voltage can be digitized, out of the amplified video signals fed into the A/D converter.

According to the invention, which comprises the amplifier of analog video signal, A/D converter capable of setting reference voltage, and arithmetic means for calculating the reference signal value, an optimum reference voltage for A/D converter is obtained from the arithmetic means, and by controlling the reference voltage, the range specified by the reference voltage is digitized, and the picture of real time density gradation is obtained. Therefore, if the optical system should fluctuate, a picture following up the optical system can be obtained by controlling the reference voltage by the feedback control from the video information stored in the memory.

DETAILED DESCRIPTION

Figure 1:
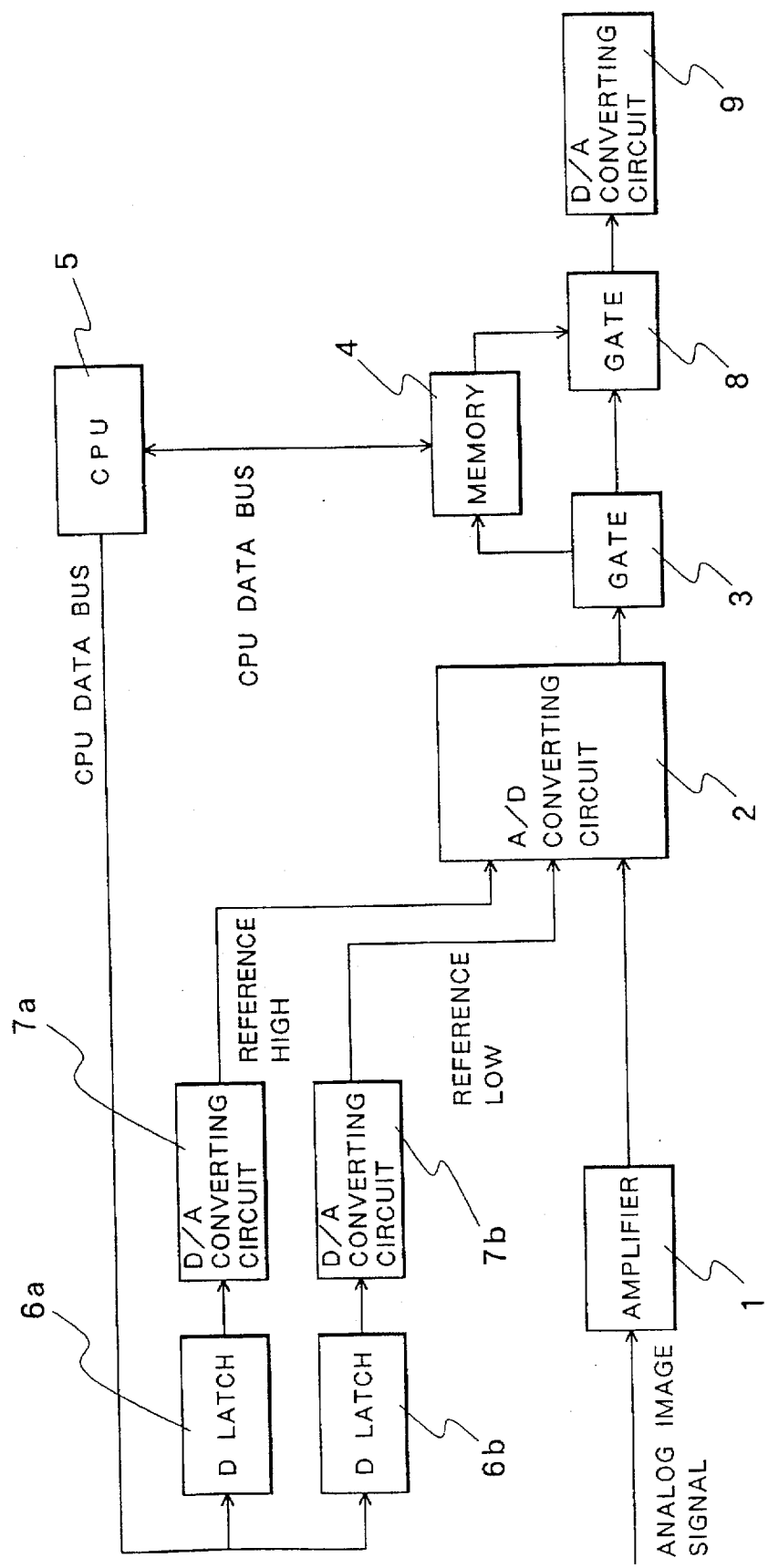
FIG. 1 is a block diagram showing an embodiment of a high speed image density converting apparatus.

Referring now to the drawings, a high speed density converting apparatus of the invention is described below.

Figure 2:
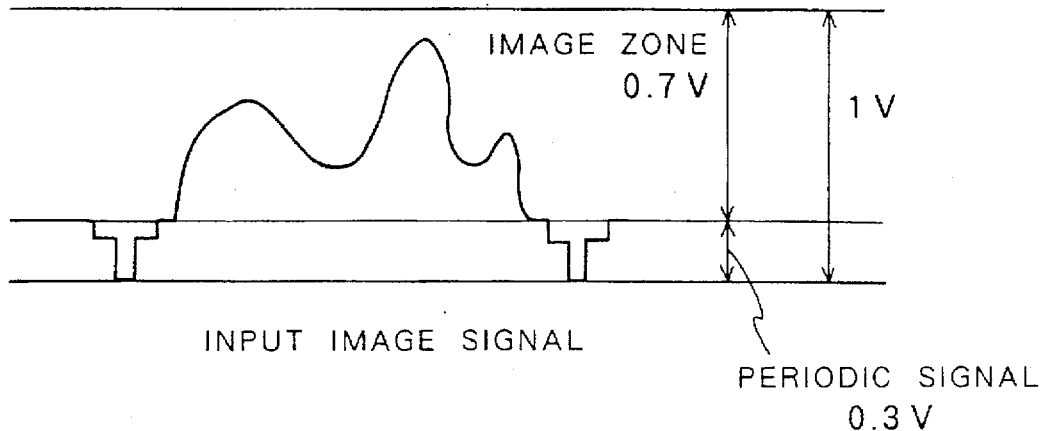
FIG. 2 is a diagram showing the relation of an example of input video signal and reference value.
Figure 3:
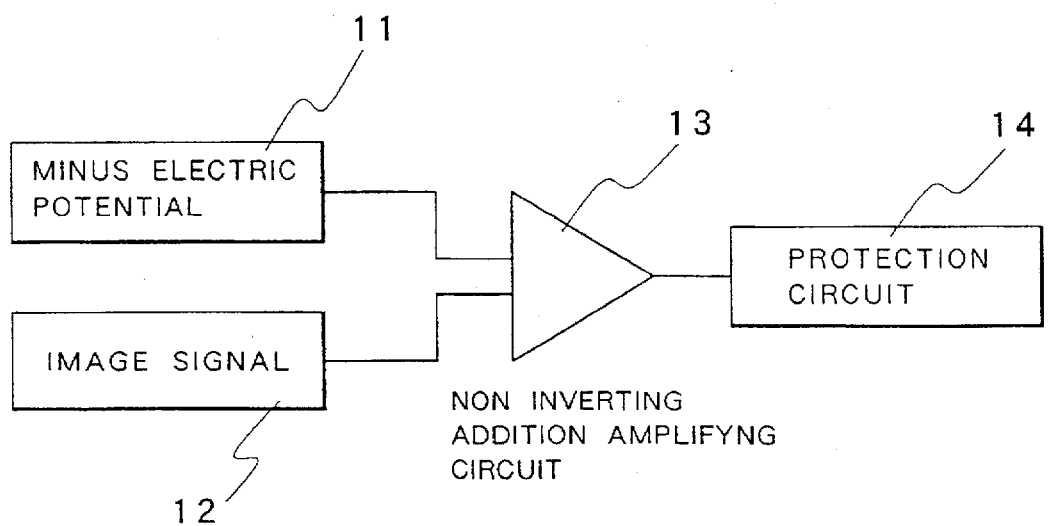
FIG. 3 is a block diagram showing an example of the amplifier in FIG. 1.
Figure 4:
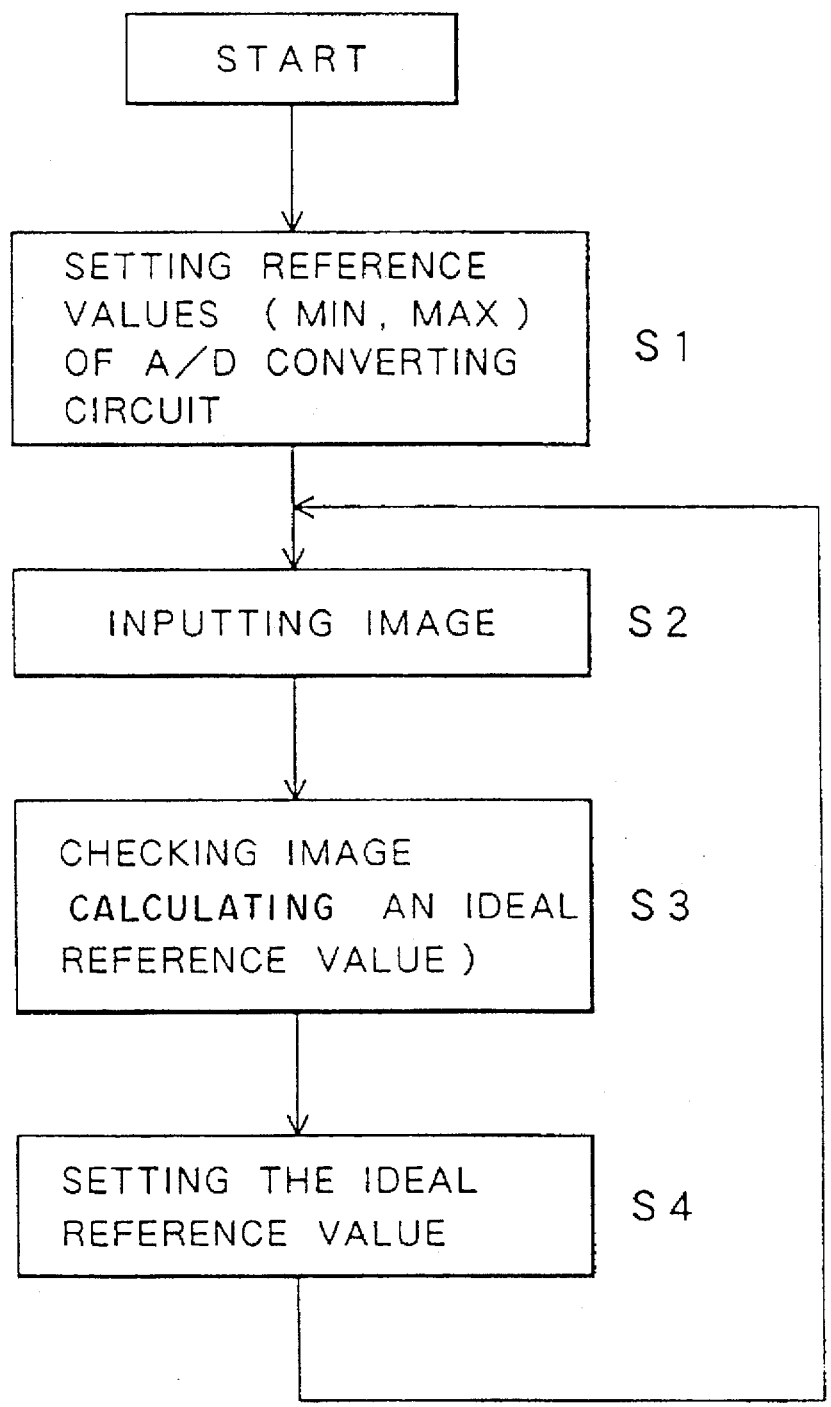
FIG. 4 is a flow chat of arithmetic means for calculating the reference values.
Figure 5:
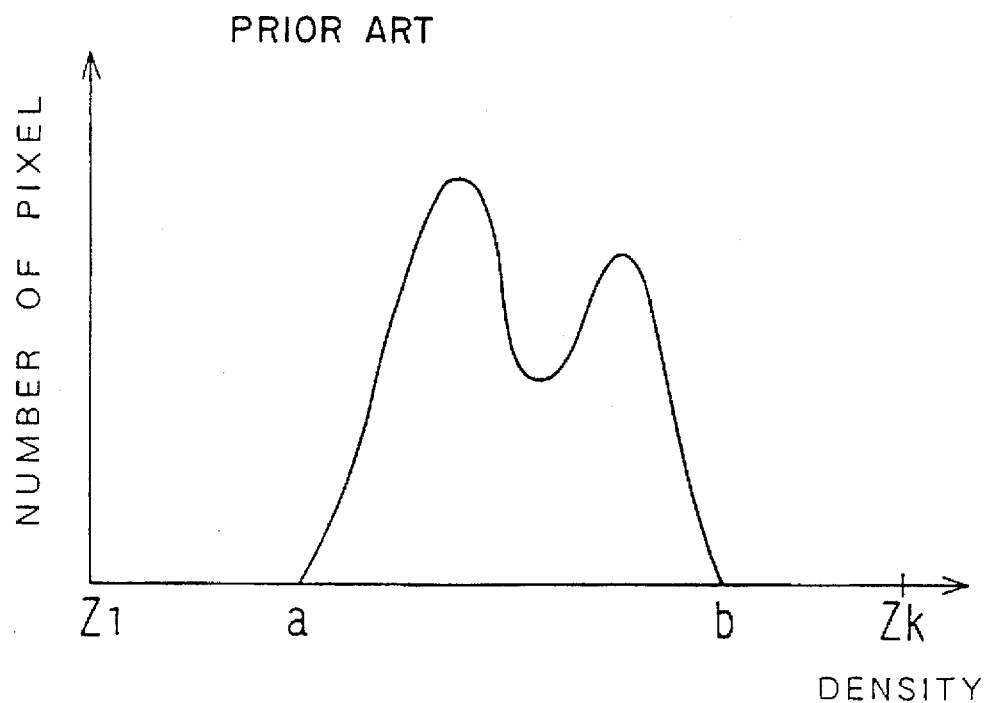
FIGS. 5(a) and 5(b) explain the principle of conventional image density gradation conversion.
Figure 5:
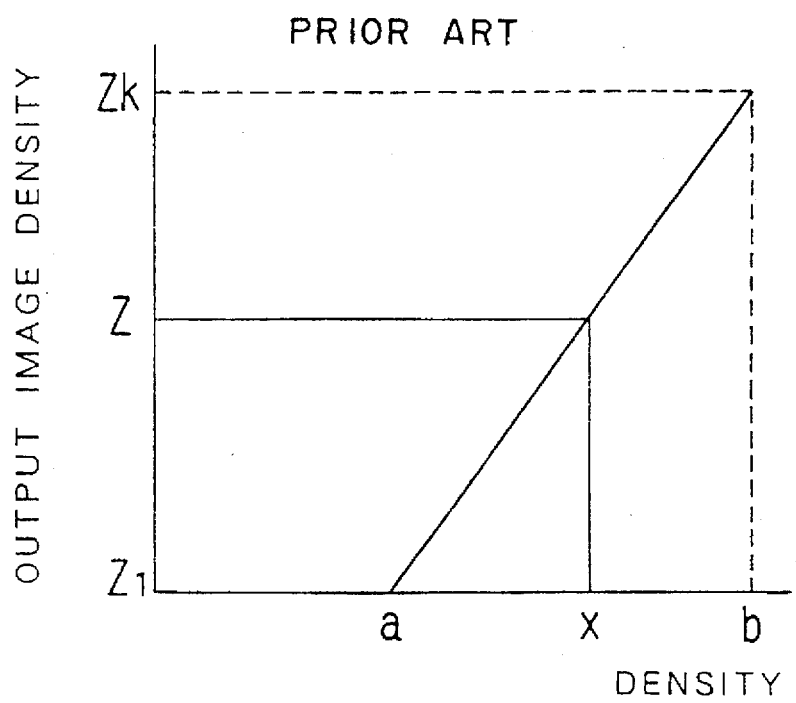
Figure 6:
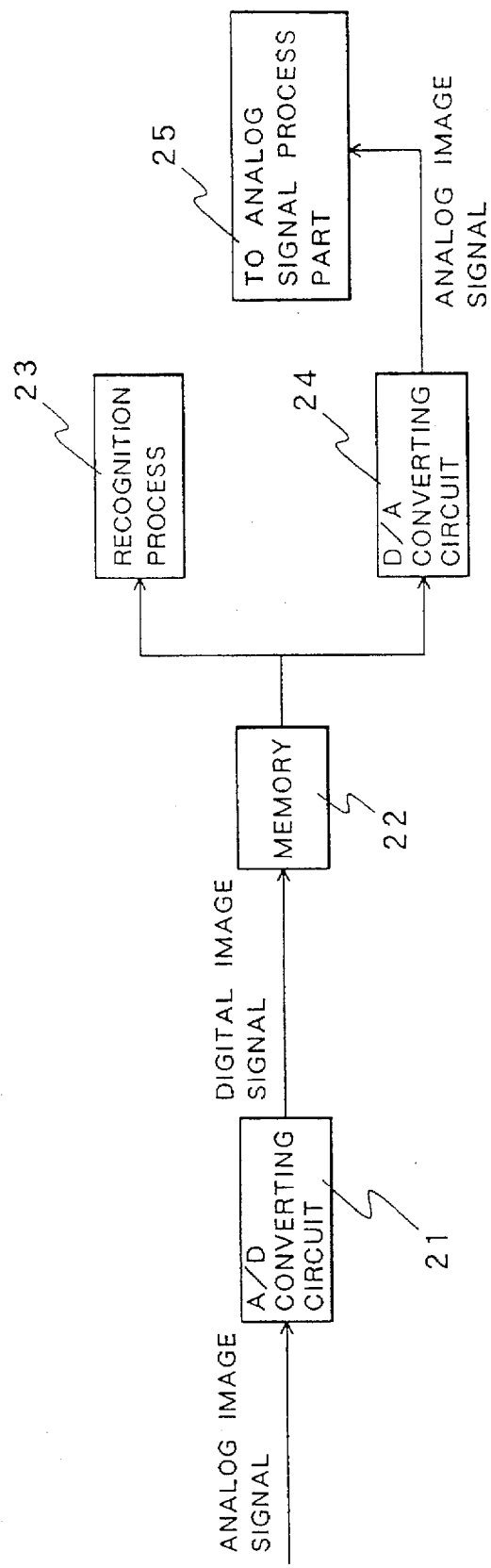
FIG. 6 is a block diagram of an example of density gradation conversion by software in prior art.
Figure 7:
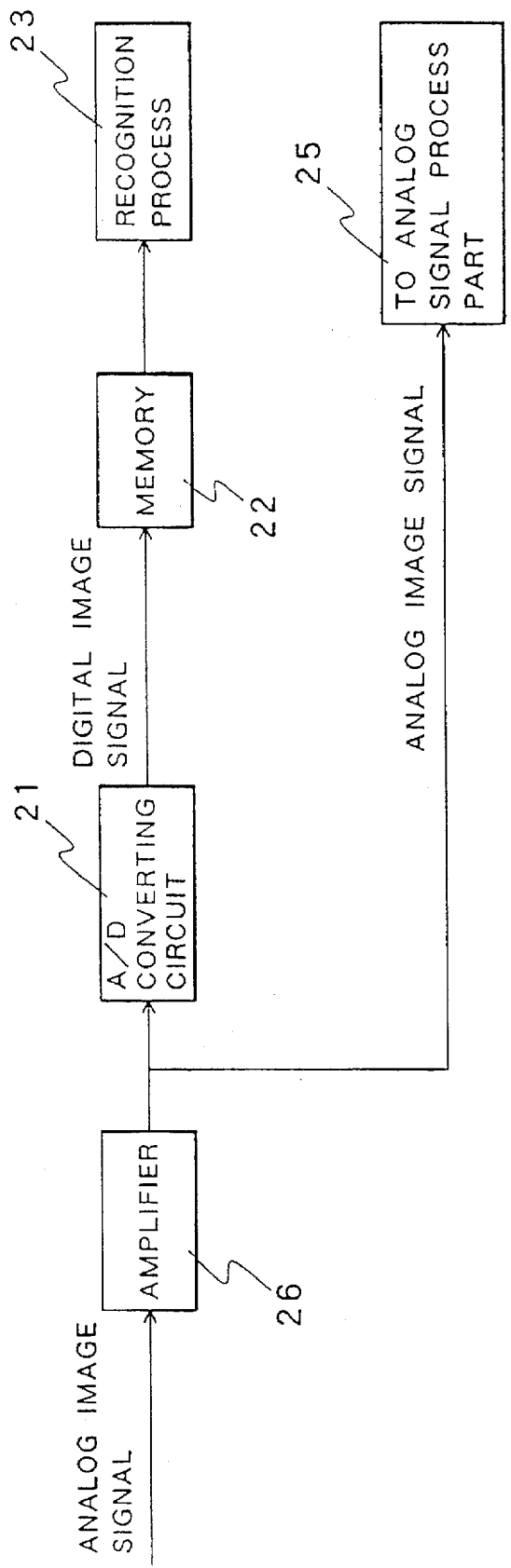
FIG. 7 is a block diagram of an example of density gradation conversion by amplification in prior art.

FIG. 1 is a block diagram showing an embodiment of a high speed image density converting apparatus of the invention, FIG. 2 is a diagram showing the relation of an example of video signal and reference value, FIG. 3 is a block diagram showing an example of the amplifier in FIG. 1, and FIG. 4 is a flow chart of arithmetic means for calculating the reference signal value.

In FIG. 1, an analog video signal picked up by a vidicon camera or the like is put into an amplifier 1 and is amplified. The amplified analog video signal is converted into a digital video signal in a high speed A/D converter 2. The A/D converter should be preferably wide in the reference setting range, having a high speed and high analysis capacity. The converted digital video signal is separated in a gate 3, and is partly stored in a memory 4 to be presented to a CPU 5 having arithmetic means for calculating the reference signal value, and the reference value is set by the arithmetic means. The maximum value and minimum value of the set reference value (digital quantity) are stored respectively in D LATCHES (or D-latches) 6a, 6b, and converted into analog quantities in D/A converters 7a, 7b, and supplied into the A/D converter 2 to control the amplification rate of the amplifier 1. The reminder of separation in the gate 3 is returned into analog video signal in a D/A converter 9, together with the signal passing through the memory 4 at a gate 8, and presented to an analog signal processor such as monitor TV.

The reference value is set as follows:

An example of video signal of NTSC (a standard of video signal transmission method) is shown in FIG. 2, in which the NTSC signal is sent at 1 V.P.P. as video signal, and 0.7 V thereof can be handled as video data, while the remaining 0.3 V is used as synchronizing signal. Accordingly, if the reference signal usable as an image is 0 to 2.55 v, the circuit is composed so that the amplifier 1 drops the input video signal from 0.3 V to 0 V, and amplifies the potential of 1 V to 2.55 V.

An example of such an amplifying circuit is shown in FIG. 3. In FIG. 3, a minus potential (−0.3 V) corresponding to 0.3 V of the synchronizing signal is fed to one input terminal 11 of non-inverting addition amplifying circuit 13, and a video signal is fed into other input terminal 12 to add, so that the upper portion of the synchronizing signal may be 0 V, and then by non-inverting amplification, the maximum value is set to 2.55 V. In this case, in order to prevent a minus potential or a voltage larger than 2.55 V from being applied to the A/D converter 2, for example, a protective circuit 14 composed of a first diode connected so that the 2.55 V side may be a cathode terminal, and a second diode connected between a signal wire and the ground so that the ground side may be an anode terminal is inserted between the output signal wire of the non-inverting amplifying circuit 13 and the 2.55 V potential. By these diodes, if a potential higher than 2.55 V is fed, it flows to the 2.55 V potential side through the first diode, or if a negative potential is fed, a current flows from the ground through the second diode, so that input of potential higher than 2.55 V or minus potential into the A/D converter 2 is blocked. In the foregoing explanation, the maximum (MAX) and minimum (MIN) values of the limits of the A/D converter 2 are determined, but the actual density distribution of each pixel of the input video signal shown, for example, in FIG. 2 distributes between the ideal image reference value HIGH and ideal image reference value LOW, and it is preferable for enhancing the contrast to bring the range of the ideal image reference values as close to the maximum and minimum value as possible in the A/D converter, and by successively setting the ideal image reference values, it is similarly amplified by the amplifier 1 so that the density gradation may distribute in this range.

A flow chart of arithmetic means for calculating the reference value in the CPU 5 is shown in FIG. 4.

In FIG. 4, first the MAX value and MIN value of the reference values of the A/D converter 2 are set (S1). Next, converting into a digital video signal in the A/D converter 3, the digital video data stored in the memory 4 is taken in (S2), and the image information is calculated so that the CPU can taken in the ideal image, and by checking the image, the ideal reference values are calculated (S3). By checking all images, the ideal reference values are set from the maximum and minimum values of the density distribution (S4).

By such processing, moving picture data of real time density gradation or still picture data in the memory may be obtained.

In the embodiment, the arithmetic means of CPU 5 is used only in density gradation converting processing, but when processing in the CPU 5 in device control and others, steps S2 to S4 can be executed at arbitrary time intervals in the flow chart in FIG. 4 (interval timer processing), so that it is possible to follow up the fluctuations of the optical system.

Calculation of ideal reference values can be done not only in the simple contrast adjustment, but similarly in the adjustments of feature luminance extraction, object follow-up density conversion, etc.

According to the invention, the density gradation of picture can be done in real time, and moving picture and other picture requiring high speed processing can be processed.

In the recognition processing of still picture, too, in the environments of drastic fluctuations of optical system, it is possible to follow up flexibly, and pictures of excellent contrast are always obtained. Moreover, by interval timer processing, as mentioned above, it may be applied to unmanned apparatus.

Though several embodiments of the present invention are described above, it is to be understood that the present invention is not limited only to the above-mentioned, various changes and modifications may be made in the invention without departing from the spirit and scope thereof.

What is claimed is:

1. A high speed image density converting apparatus comprising:

an amplifier for amplifying an analog video signal;

an A/D converter for converting an output of the amplifier into a digital video signal, and capable of setting a reference voltage;

a first gate means for separating said converted digital video signal from said A/D converter into first and second signals;

a memory for storing said first signal as an output image of the A/D converter;

arithmetic means for calculating a reference signal value based upon the data stored in the memory;

a latch means for latching maximum and minimum values of said reference voltage;

a second gate means for gating the reference signal value and the second signal; and a D/A converter for converting the reference signal value issued from the arithmetic means and the second signal into an analog signal to be output as reference voltage.

2. The high speed image density converting apparatus of claim 1, wherein said amplifier comprises an amplifying circuit composed in a manner as to drop said video signal from 0.3 V to 0 V, and as to amplify 1 V to 2.55 V.

* * * * *